United States Patent [19]

Brady

[11] Patent Number: 4,752,095
[45] Date of Patent: Jun. 21, 1988

[54] TRUCK BED INSERT

[76] Inventor: Dean S. Brady, 9639 Harper Hill Rd., Port Orchard, Wash. 98366

[21] Appl. No.: 903,732

[22] Filed: Sep. 3, 1986

[51] Int. Cl.$^4$ .............................................. B60R 9/00
[52] U.S. Cl. ..................................... 296/37.6; 224/310
[58] Field of Search ..................... 296/37.6, 37.16, 26; 312/DIG. 33; 224/310, 273

[56] References Cited

U.S. PATENT DOCUMENTS

| | | | |
|---|---|---|---|
| 2,852,303 | 9/1958 | Hopson | 296/26 |
| 2,898,146 | 8/1959 | Yudenfreund | 296/39 R |
| 4,303,367 | 12/1981 | Bott | 296/37.16 |
| 4,522,326 | 6/1985 | Tuohy III | 296/37.6 |
| 4,609,313 | 9/1986 | Oshino et al. | 296/26 |

FOREIGN PATENT DOCUMENTS

| | | | |
|---|---|---|---|
| 1439762 | 4/1966 | France | 296/39 R |
| 2438564 | 6/1980 | France | 296/37.16 |

Primary Examiner—Robert B. Reeves
Assistant Examiner—Carol L. Olson
Attorney, Agent, or Firm—Seed and Berry

[57] ABSTRACT

A truck bed insert for pickup trucks including a wheeled receptacle for tools or other objects mounted to roll along tracks in a rigid sheet bedliner. The receptacle is movable between a forwardmost stowed position near the truck cab and a rearwardmost position near the tailgate for easy access. A handle is provided to facilitate movement and to releasably lock the receptacle in the forwardmost position. Sliding bolts are also provided to lock the receptacle against movement. A bedliner extension is hinged to the bedliner and covers the tailgate when down to permit the receptacle to be moved onto the tailgate. The handle is releasably retained in a groove in the bedliner when the receptacle is in the forwardmost position.

27 Claims, 3 Drawing Sheets

TRUCK BED INSERT

TECHNICAL BACKGROUND

The invention relates to storage boxes for use within pickup truck boxes and with cargo beds of other trucks.

BACKGROUND OF THE ART

Tool boxes, storage boxes and lockers of a general nature are available for use with pickup trucks for storing tools and other items in the box of the pickup truck. Typically, these storage boxes are designed to be stowed in a forwardmost position in the truck box near the cab, either by resting on the bed or on the sidewalls of the truck box. In one version of such a tool box, the top of the box is selectively covered by a lid. The lid is hinged so that access to the box is available from the sides of the truck bed. This type of box is often weather-proof so that a tarpaulin cover or camper top is not required to keep the box and the contents thereof dry.

While boxes of this type are an improvement over loosely placing tools and other objects in the truck box, they prevent the use of a tarpaulin covering the entire truck box. A simple storage or tool box sitting on the bed of the truck box and unrestrained would allow covering the entire box with a tarpaulin. While the storage box could be placed at the rear of the bed so that it is accessible from the tailgate, the box would slide around unless fastened down. If fastened at the rear of the truck box, usage of the rearward portions of the truck box for cargo would be difficult. If fastened at the front of the truck box toward the cab so as not to block the tailgate area, access to the storage box would be impossible from the tailgate without crawling under the tarpaulin or removing all or at least the forward portion of the tarpaulin to expose the box. As such, access would probably be obtained by reaching over the sidewalls of the truck box after having removed the forward portion of the tarpaulin to expose the storage box.

These approaches are undesirable since it is preferred to have access to objects in the storage box from the truck tailgate, rather than from the sides of the truck, and without having to remove the tarpaulin. Without making the storage box nonmovable and positioning it at the tailgate, such accessibility is precluded. So positioning the storage box, however, blocks the tailgate area and reduces the utility of the truck.

DISCLOSURE OF THE INVENTION

It is an object of the present invention to provide a storage receptacle or box for truck beds which is movable between a stowed position at the forward end of the truck bed, near the cab, and an accessible position at the rearward end of the truck bed. When used with a pickup truck, the rearward position can be over the tailgate.

It is a further object of the invention to provide a storage receptacle for truck beds which is releasably retained in the forwardmost position while the truck is underway and in the rearwardmost position when access to the storage receptacle is desired.

It is another object of the present invention to achieve the above two objects and maintain the rearward portion of the truck bed free from obstructions while the storage box is in the forwardmost stowed position.

The invention achieves these and other objects and advantages which will become apparent from the description which follows, by providing a bedliner positionable on the truck bed and a receptacle positioned on the bedliner for storing objects therein. The receptacle is movable over the bedliner between a forwardmost stowed position and a rearwardmost access position. The invention further includes means for guiding the receptacle movement on the bedliner, means for releasably retaining the receptacle in the forwardmost position, and means for releasably retaining the receptacle in the rearwardmost position. More specifically, the receptacle has wheels and is guided between the forwardmost and rearwardmost positions by tracks within which the wheels ride. The receptacle can be locked in either the forwardmost or rearwardmost position using sliding bolts.

In a preferred embodiment, the tracks are recesses in the bedliner. The receptacle has a handle which is pivotally connected thereto so that the handle can rest in a recess in the bedliner below the upper surface level of the bedliner. In this way, when the receptacle is in the forwardmost stowed position the bedliner has a substantially unobstructed upper surface which leaves the rearward part of the bed free for other uses. The handle can be provided with a transverse grip portion which is received in a transverse groove in the bedliner to releasably restrained the receptacle in the stowed position. The user can release the receptacle from the stowed position by merely lifting the handle grip portion from the handle groove. The user can then slide the receptacle rearwardly on the tracks by pulling on the handle so that the receptacle is moved into position on or at the tailgate.

In those situations when the insert is used with trucks which have downwardly folding tailgates, a tailgate bedliner extension is provided. The tracks extend onto the bedliner extension so that the rearward end of the receptacle can be brought almost to the end of the folded down tailgate. The handle preferably pivots with respect to the receptacle so that once the receptacle is in the rearwardmost position, the handle can be pivoted down out of the user's way. Other devices are provided which limit the maximum rearward travel of the receptacle so that the receptacle does not slide off the bedliner and off of the truck bed.

BEST MODE FOR CARRYING OUT THE INVENTION

Figure 1:
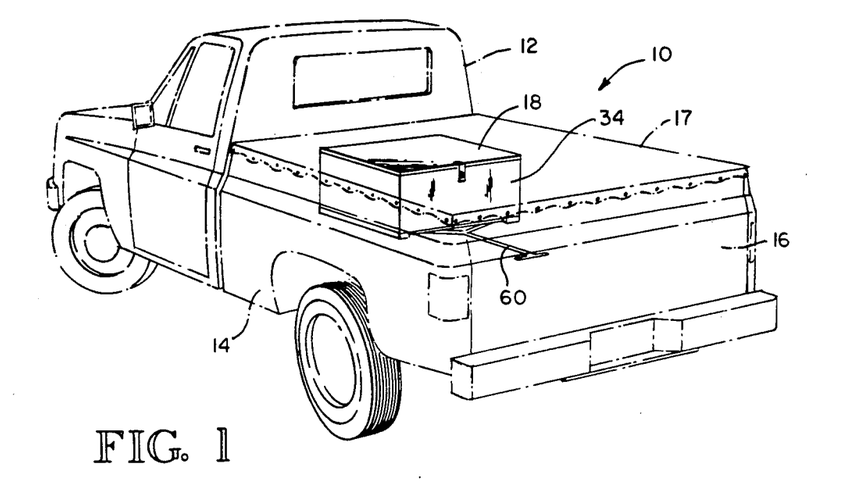
FIG. 1 is an isometric view of a conventional pickup truck with a tarpaulin covering the truck box and having the truck bed insert of the present invention installed therein with a movable receptacle locked in the forwardmost, stowed position. The truck is shown in phantom lines.

In FIG. 1, a truck bed insert, in accordance with the present invention, is generally indicated by reference numeral 10. A conventional pickup truck 12 is shown in phantom lines having a cab 13 and a truck box 14 with a pivotally mounted tailgate 16 and covered by a tarpaulin 17. The truck bed insert 10 is positioned within the truck box under the cover of the tarpaulin. For the purposes of this description, the term "forwardmost" will refer to a position which is toward the cab 13 and the term "rearwardmost" will refer to a position which is toward the tailgate 16.

Figure 2:
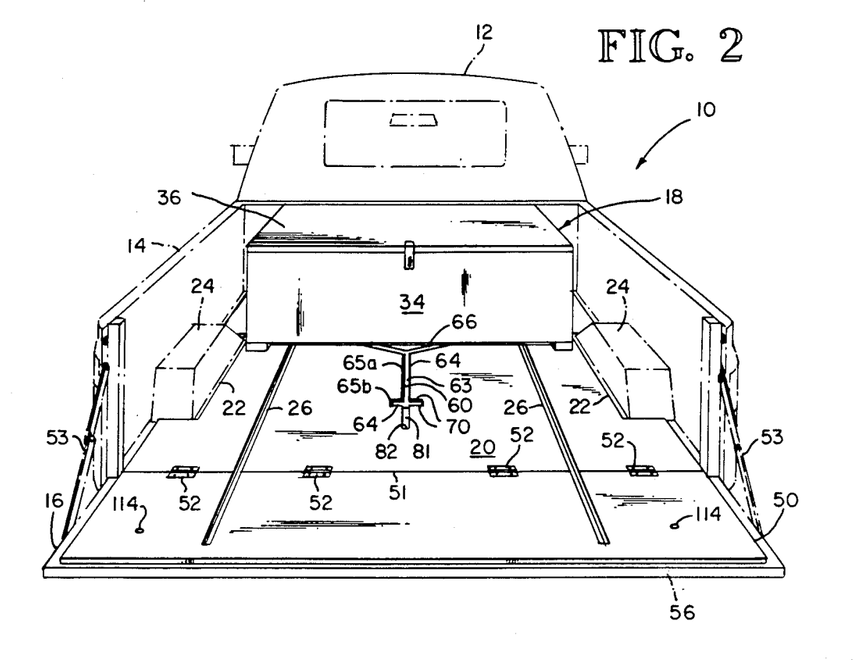
FIG. 2 is an isometric view of the truck of FIG. 1 with its tailgate in the down position looking from the tailgate end of the truck toward the cab.
Figure 3:
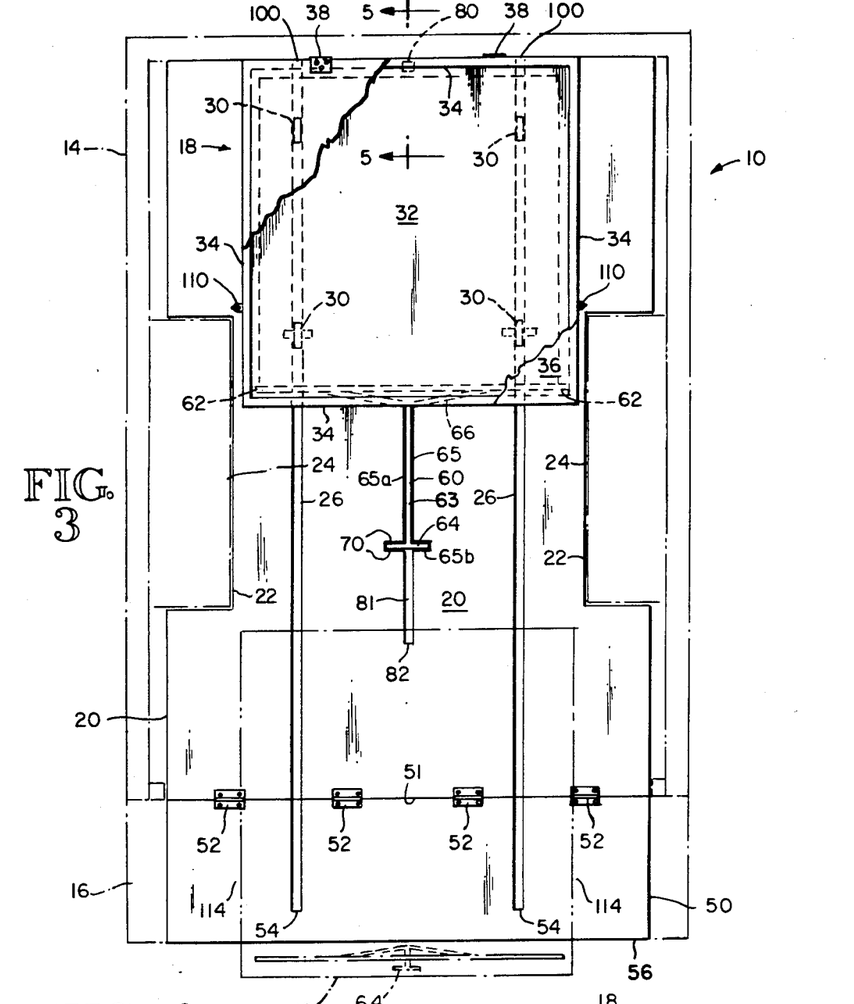
FIG. 3 is an enlarged, top plan view of the truck bed insert of FIG. 1 with the receptacle shown in the forwardmost, stowed position in solid lines and shown in the rearwardmost, accessible position in phantom lines.
Figure 4:
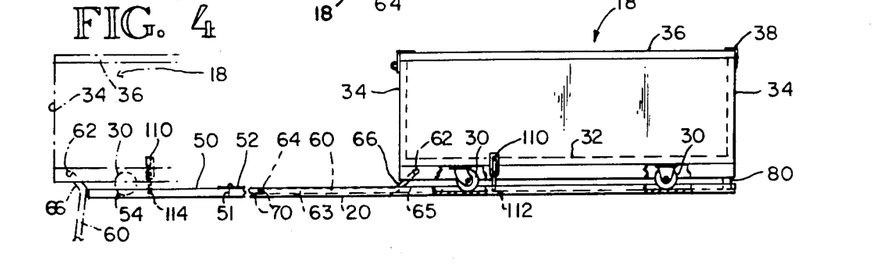
FIG. 4 is an enlarged, right side elevational view of the truck bed insert of FIG. 1 illustrating the pivotal operation of the handle, with the receptacle shown in solid lines in the forwardmost position and in phantom lines in the rearwardmost position.
Figure 5:
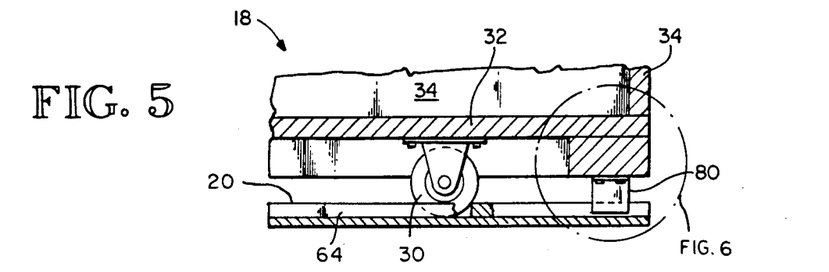
FIG. 5 is an enlarged, partial sectional view of the receptacle taken substantially along line 5—5 of FIG. 3.

A storage box or receptacle 18 is rollably mounted on a rigid sheet bedliner 20 for movement between a forwardmost stowed position, as shown in FIGS. 1, 2 and 3, and a rearwardmost accessible position, as shown in phantom lines in FIGS. 3 and 4. The bedliner 20 rests on and overlays substantially the entire bed of the truck box. The bedliner extends from a forward sidewall of the truck box to the rearward edge of the bed at which the tailgate is mounted. The bedliner preferably has a relatively smooth planar upper surface and has side cut-away areas 22 which are shaped and positioned to closely receive the wheel wells 24 of the bed 14. In this manner, the bedliner 20 is positively located in the truck box 14 and cannot slide over the bed during accelerations or decelerations of the truck.

The bedliner 20 has a pair of parallel left and right spaced apart wheel tracks 26, which are best seen in FIG. 3. The receptacle has four wheels 30 attached to a bottom 32 of the receptacle 18 and which rollably support the receptacle above the bedliner 20. The wheels 30 are arranged with one wheel toward each corner of the receptacle bottom 32, with the two leftmost wheels riding in the left track of the tracks 26, and with the two rightmost wheels riding in the right track. The tracks are recessed and have a width sufficient to closely receive the wheels 30 while allowing their free rolling in the tracks. With recessed tracks the upper surface of the rearward portion of the bedliner is substantially unobstructed when the receptacle is in the forwardmost position, leaving the rearward portion of the bed free for other uses, such as carrying cargo. In the preferred embodiment, the receptacle is a relatively large storage box having four perpendicular sidewalls 34 which are closed by a lid 36. The lid is pivotally connected to a rearward facing sidewall of the receptacle sidewalls by a pair of hinges 38.

The recessed receptacle tracks 26 extend onto a rigid sheet bedliner extension 50 having the same thickness as the bedliner 20. The bedliner extension is pivotally connected to a rearward end 51 of the bedliner 20 by four hinges 52, and rests on and generally overlays substantially the entire tailgate 16 when the tailgate is in the horizontal open position supported by a pair of tailgate support links 53, as shown in FIG. 2. The bedliner extension is not, however, fixed to the tailgate in this preferred embodiment, and is left free to slide relative to the tailgate when the tailgate is opened and closed. Because the bedliner 20 and the bedliner extension 50 have an appreciable thickness, as is shown in FIGS. 2, 4, 5 and 6, fixing the bedliner extension to the tailgate in a position so as not to bind with the bedliner when closing of the tailgate would produce a large gap between the bedliner and the bedliner extension when the tailgate is open. This gap is undesirable since it may interfere with the smooth operation of the wheels 30 as they roll between the bedliner and the bedliner extension.

It is noted that while not as desirable, the extension could be fixed to the tailgate if space sufficiently from the rearward end 51 of the bedliner so as to clear the rearward end of the bedliner as the tailgate is pivoted to the closed position. In this case, the hinges 52 would not be used.

The thickness of the bedliner 20 and the bedliner extension 50 is determined by the depth of the tracks 26, which are in turn determined by the diameter of the wheels 30. A track depth is selected to minimize the wheels jumping or rolling out of the tracks. In the preferred embodiment shown, the wheels have a diameter of approximately 1 to 3 inches, and the tracks 26 have a depth of approximately one-half inch. The bedliner 20 and the bedliner extension 50 have a thickness of approximately one inch.

The tracks 26 guide the wheels 30 which support the receptacle 18 as the receptacle is rolled between the forwardmost position against the front sidewall of the truck bed, as shown in solid lines, and the rearwardmost position over the tailgate 16 as shown in phantom lines in FIGS. 3 and 4. Since the tracks 26 are recessed below the level of the upper surface of the bedliner 20, the tracks do not present any obstruction which would prevent usage of the rearward portion of the truck box for carrying cargo, and objects placed in the box can be freely moved around on the portion of the bedliner not occupied by the receptacle without interference from the tracks.

As shown in FIGS. 3 and 4, the rearward ends of the tracks 26 on the bedliner extension 50 are provided with vertical end stop walls 54 to engage the rearward pair of wheels of the receptacle wheels 30 and limit the maximum rearward movement of the receptacle 18. The rearward pair of wheels are attached to the receptacle bottom 32 at positions such that the rearward sidewall of the receptacle sidewalls 34 slightly overhangs a rearward end 56 of the tailgate 16 when the tailgate is in the open position and the rearward pair of wheels are in engagement with the track end walls 54, as shown in FIGS. 3 and 4 in phantom line. This arrangement allows the receptacle to be stored and carried about in the forwardmost position, and then moved to the rearwardmost position for easy access while the user is standing at the tailgate without removing the tarpaulin 17 covering the bed and without the receptacle rolling off the tailgate.

The receptacle 18 further includes a handle 60 which is pivotally connected to the bottom 32 of the receptacle toward its rearward end at pivot points 62. The wheels 30 and the track end walls 54 are positioned to locate the receptacle rearward facing sidewall overhanging the rearward end 54 of the tailgate 16, when the receptacle is in the rearwardmost position and the tailgate is open, by a sufficient amount to permit the handle to drop or swing downwardly and out of the user's way. This allows the handle to swing downward into a substantially vertical position as shown in phantom in FIG. 4.

As best shown in FIGS. 2, 3 and 4, the handle 60 has an elongated shank portion 63 and a transverse grip portion 64 to form a T-shaped grip. The handle 60 is received in a correspondingly shaped handle groove 65 in the bedliner 20 having a depth sufficient to permit the handle when received in the groove to be flush with or slightly below the upper surface of the bedliner. The handle has a connector portion 66 which extends generally transverse to the shank portion, and is not received in the handle group. The connector portion is pivotally connected to the receptacle bottom 32 at the pivot points 62. The shank portion and connector portion of the handle are angled relative to each other when viewed in a vertical plane, i.e. from the side, such as shown in FIG. 4, to allow the shank and handle portions to lay within the handle groove 65 flush with the upper surface of the bedliner 20 with the pivot points 62 located above the upper surface level of the bedliner.

The handle 60 can be pivotally raised and removed from the handle groove 65 for use to push the receptacle 18 into the forwardmost position or to pull the receptacle into the rearwardmost position while the user is standing at the truck tailgate 16. The handle grip portion 64 providing the T-shaped grip at the end of the handle shank portion 63 allows convenient gripping by the user. The length of the handle shank portion 63 is selected sufficiently long so that the user can conveniently reach into the truck box 14 over the tailgate 16 when opened and grab the handle grip portion 64 while standing behind the tailgate, but is sufficiently short that the handle does not touch the ground when it is pivoted downwardly with the receptacle in the rearwardmost position and the tailgate swung fully downward, as shown in FIG. 4 in phantom lines. When the insert is designed for use with trucks having unusually long beds, the handle can be manufactured in two sections with a telescoping assembly (not shown) or other breakdown means which are well known to those skilled in the art in order to allow the handle to swing fully downward without touching the ground.

The handle groove 65 has an elongated groove portion 65a to receive the handle shank portion 63 and a transverse group portion 65b to receive the handle grip portion 64. The transverse group portion 65b has forward and rearward vertical stop walls 70 which the handle grip 64 engages when positioned in the handle groove portion 65b to lock the receptacle in the forwardmost position and prevent forward or rearward movement of the receptacle. In this way, the receptacle is releasably restrained against any movement, and prevented from moving out of the forwardmost stowed position when the vehicle accelerates or decelerates. The weight of the handle 60 biases the handle grip portion 64 into the received position within the handle groove portion 65b. The user may easily lift the handle grip portion 64 from the handle groove portion 65b to unlock the receptacle and permit the user to move it about by pulling or pushing on the handle 60.

A safety finger 80 is provided as an additional safety measure to prevent excessive rearward movemet of the receptacle 18, should the rearward pair of wheels 30 tend to travel rearwardly beyond the end stop walls 54 of the tracks 26. The safety finger is fixedly attached to the receptacle bottom 32 at the forward end thereof and projects downward into the groove portion 65a. So as not to unduly restrict the rearward movement of the receptacle in situations where the groove portion 65a is too short to allow full travel of the receptacle to the rearwardmost position due to the length of the handle shank portion 63 selected, the groove portion 65a is provided with an extension groove portion 81 extending rearwardly beyond the transverse groove portion 65b. The extension groove portion 81 has an end stop wall 82 positioned so that the safety finger 80 contacts a stop wall 82 when the receptacle 18 reaches the rearward most position to prevent further rearward movement of the receptacle.

Figure 6:
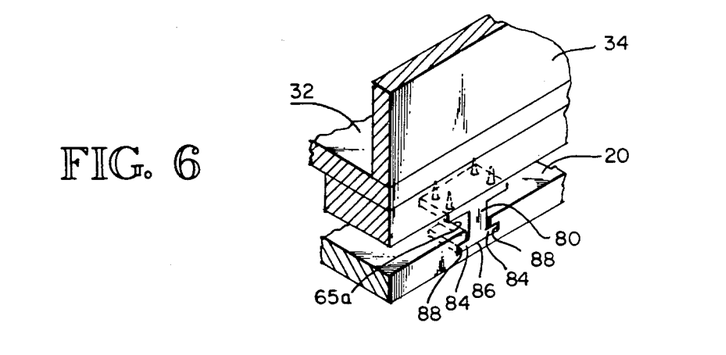
FIG. 6 is an enlarged, partial isometric view of the circled area of FIG. 5 indicated by the numeral 6.

In an alternative embodiment shown in FIG. 6, the safety finger 80 is provided with transverse flanges 84 extending laterally from a lower end 86 thereof. The flanges are received in correspondingly shaped transverse undercuts 88 in the handle grooves portion 65a. The extension groove portion 81 is similarly shaped with undercuts. In this way, the safety finger 80 is positively retained in the handle groove portion and the receptacle wheels 30 cannot ride out of the tracks 26 as the receptacle is moved about during use or jostled about during travel of the truck 12. The intersection of the handle groove portion 56a with the transverse groove portion 65b provides a position at which the safety finger 80 can be removed from the handle groove when desired.

The receptacle is further provided with a pair of slide bolts 110 to secure the receptacle 18 in the rearwardmost position at the tailgate 16 against movement, and to provide a lock in addition to that provided by the handle grip portion 64 resting in the transverse group portion 65b when the receptacle is in the forwardmost stowed position. The bolts may be maintained by any conventional means such as by friction in a retracted position. When moved to an extended position, with the receptacle in the forwardmost position, the bolts project downward into a pair of correspondingly located receiver lock openings 112 in the bedliner 20. With the receptacle in the rearwardmost position, the bolts project downward into a pair of correspondingly located receiver lock openings 114 in the bedliner extension 50.

Various other embodiments of the invention are also contemplated in addition to the above described preferred embodiment, for example, the receptacle 18 can be a three sided bin or have a variety of other shapes and sizes, and need not be provided with a lid. Furthermore, although the preferred embodiment of the invention has been described for use with a pickup truck, the invention is not be be so limited. It is contemplated that the present invention also be adapted for use with flat bed trucks, covered vans, trailers and the like, without departing from the spirit of the invention.

Therefore, the invention is not to be limited by the above description but is to be determined in scope by the claims which follow.

I claim:

1. A storage insert for truck beds, comprising:
a bedliner positionable on the truck bed and having a forward end toward the truck cab and a rearward end toward the rearward end of the truck bed;
a storage receptacle positioned on the bedliner and movable thereover, the receptacle having means for storing objects therein, the receptacle being movable between a forwardmost stowed position adjacent to the truck cab and a rearwardmost access position at the rearward end of the truck bed;
receptacle guide means for guiding the receptacle movement on the bedliner between the forwardmost and rearwardmost positions;
forward retainer means for releasably retaining the receptacle in the forwardmost position; and
a handle connected to the receptacle for pulling the receptacle to the rearwardmost position and for pushing the receptacle to the forwardmost position, the handle being pivotally connected to the receptacle and having a first portion extending from the receptacle towards the rearward end of the bedliner and a second portion for grasping by the user and attached to the first handle portion, the forward retainer means including releasable means for releasably retaining the second handle portion when the receptacle is in the forwardmost position on the bedliner to prevent rearward movement of the receptacle.

2. The insert of claim 1, wherein the receptacle guide means includes at least one elongated guide track, and the receptacle has engagement means for engaging the guide track to limit lateral movement of the receptacle as the receptacle moves along the track.

3. The insert of claim 1 wherein the receptacle guide means includes a pair of spaced apart recessed guide tracks formed in the bedliner and extending between the bedliner forward end and rearward end, and the receptacle further includes at least a pair of spaced apart wheels, each wheel riding in one of the tracks and supporting the receptacle.

4. The insert of claim 3 wherein the bedliner has a substantially planar top surface and the guide tracks include two substantially parallel grooves in the bedliner having substantially constant widths and having bottoms below the bedliner top surface, and wherein the wheels have a width selected to be closely received by the grooves so that the wheels are laterally guided by the grooves.

5. The insert of claim 3 wherein the guide tracks are grooves formed in the bedliner, and at least one of the grooves has a groove end wall toward the bedliner rearward end to engage and prevent the wheel therein from rolling out of the groove upon reaching the groove end with the receptacle in the rearwardmost position, whereby further rearward movement of the receptacle is inhibited.

6. The insert of claim 5 for use with a pickup truck having a tailgate, the bedliner including a portion in the truck bed and a bedliner extension positionable on the tailgate when in the opened, generally horizontal position, the receptacle being movable to over the bedliner extension when in the rearwardmost position, the guide track grooves extending onto the bedliner extension and being formed therein, the groove end wall being positioned in the bedliner extension.

7. The insert of claim 6, wherein the bedliner extension is pivotally connected to the truck bed bedliner portion and free to slide relative to the tailgate as the tailgate is moved between an open and a closed position, the bedliner extension having a length sufficient to overlay at least a portion of the tailgate when the tailgate is in the opened, generally horizontal position.

8. The insert of claim 1 further including rearward retainer means for releasably retaining the receptacle in the rearwardmost position.

9. The insert of claim 8 wherein the rearward retainer means includes at least one lock element connected to the receptacle and operable to engage a cooperating lock element on the bedliner.

10. The insert of claim 9 wherein the cooperating lock element is an aperature in the bedliner and the receptacle lock element includes a bolt selectively movable to project into the bedliner aperature, the bedliner aperature being positioned to align with the bolt when the receptacle is in the rearwardmost position.

11. The insert of claim 10 further including an aperature in the bedliner positioned to align with the bolt when the receptacle is in the forwardmost position, whereby the bolt can be selectively used to lock the receptacle in the forwardmost position.

12. The insert of claim 1 for use with a pickup truck having a tailgate, the bedliner further including a bedliner extension, positionable on the tailgate when in the opened, generally horizontal position, the receptacle being movable to over the bedliner extension when in the rearwardmost position.

13. The insert of claim 12 wherein the bedliner extension is pivotally connected to the bedliner and free to slide relative to the tailgate as the tailgate is pivoted between an open and a closed position.

14. The insert of claim 13 wherein the receptacle guide means also guides the receptacle movement on the bedliner extension.

15. The insert of claim 1 wherein the releasable means includes a recess in the bedliner sized to receive the second handle portion.

16. The insert of claim 1 wherein the second handle portion includes a transversely extending handle member, and the recess is a transversely extending stop groove in the bedliner.

17. The insert of claim 16 wherein the stop groove has a depth sufficient to fully receive the second handle member and prevent the second handle member from protruding above the upper surface level of the bedliner.

18. A storage insert for truck beds, comprising:
a bedliner positionable on the truck bed and having a forward end toward the truck cab and a rearward end toward the rearward end of the truck bed;
a storage receptacle positioned on the bedliner and movable thereover, the receptacle having means for storing objects therein, the receptacle being movable between a forwardmost stowed position adjacent to the truck cab and a rearwardmost access position at the rearward end of the truck bed;
receptacle guide means for guiding the receptacle movement on the bedliner between the forwardmost and rearwardmost positions;
forward retainer means for releasably retaining the receptacle in the forwardmost position; and
a handle connected to the receptacle for pulling the receptacle to the rearwardmost position and for pushing the receptacle to the forwardmost position, the handle including an elongated first portion pivotally connected to the receptacle and extending rearwardly from the receptacle toward the rearward end of the bedliner, and a second portion for grasping by the user and attached to the first handle portion, the releasable means including a recess in the bedliner sized and positioned to receive at least a portion of the first handle portion and the second handle portion substantially at or below the upper surface level of the bedliner when the receptacle is in the forwardmost position, whereby the handle does not obstruct usage of the truck bed area.

19. The insert of claim 18 wherein the handle recess in the bedliner includes an elongated groove in the bedliner extending from a position toward the bedliner forward end to a position toward the bedliner rearward end, and wherein the insert further includes a stop member connected to the receptacle and projecting downward into the groove, the stop member being movable with the receptacle and the groove having a length sufficient to permit the free movement of the stop member therein as the receptacle is moved between the forwardmost and rearwardmost positions, the groove having a groove stop therein position toward the rearward end of the groove to prevent rearward travel of the member and the receptacle beyond the receptacle rearwardmost position.

20. The insert of claim 19 wherein the groove stop is an end wall of the groove.

21. The insert of claim 20 wherein the stop member is fixedly attached to the receptacle and has transversely projecting flanges, and wherein the groove has corresponding transversely extending undercuts, the undercuts being positioned to slidably receive the flanges to prevent the upward movement of the receptacle away from the bedliner.

22. A storage insert for truck beds, comprising:
a bedliner positionable on the truck bed and having a forward end toward the truck cab and a rearward end toward the rearward end of the truck bed;
a storage receptacle positioned on the bedliner and movable thereover, the receptacle having means for storing objects therein, the receptacle being movable between a forwardmost stowed position adjacent to the truck cab and a rearwardmost access position at the rearward end of the truck bed;
receptacle guide means for guiding the receptacle movement on the bedliner between the forwardmost and rearwardmost positions;
forward retainer means for releasably retaining the receptacle in the forwardmost position; and
a handle connected to the receptacle for pulling the receptacle to the rearwardmost position and for pushing the receptacle to the forwardmost position, the handle being pivotally connected to the receptacle and having a length which allows the handle to be pivoted downward to a generally vertically oriented, downwardly projecting position when the receptacle is in the rearwardmost position, without the handle contacting the ground.

23. A storage insert for use with a pickup truck having a truck bed and a tailgate, comprising:
a bedliner positionable on the truck bed and having a forward end toward the truck cab and a rearward end toward the rearward end of the truck bed;
a bedliner extension positionable on the tailgate when in the opened, generally horizontal position;
a storage receptacle positioned on the bedliner and bedliner extension, and movable thereover, the receptacle having means for storing objects therein, the receptacle being movable between a forwardmost stowed position adjacent to the truck cab and a rearwardmost access position over the bedliner extension at the rearward end of the truck tailgate;
at least one elongated guide track on the bedliner and bedliner extension extending from about the bedliner forward end to about the bedliner extension rearward end for guiding the receptacle movement on the bedliner between the forwardmost and rearwardmost positions;
engagement means attached to the receptacle for engaging the guide track to limit lateral movement of the receptacle as the receptacle moves along the track; and forward retainer means for releasably retaining the receptacle in the forwardmost position; and
a handle connected to the receptacle for pulling the receptacle to the rearwardmost position and for pushing the receptacle to the forwardmost position, the handle including an elongated first portion pivotally connected to the receptacle and extending rearwardly from the receptacle toward the rearward end of the bedliner, and a second portion for grasping by the user and attached to the first handle portion, the releasable means including a recess in the bedliner sized and positioned to receive at least a portion of the first handle portion and the second handle portion substantially at or below the upper surface level of the bedliner when the receptacle is in the forwardmost position whereby the handle does not obstruct usage of the truck bed area.

24. The insert of claim 23 wherein the second handle portion includes a transversely extending handle member, and the recess is a transversely extending stop groove in the bedliner.

25. The insert of claim 23 wherein the handle recess in the bedliner includes an elongated groove in the bedliner extending from a position toward the bedliner forward end to a position toward the bedliner rearward end, and wherein the insert further includes a stop member connected to the receptacle and projecting downward into the groove, the stop member being movable with the receptacle and the groove having a length sufficient to permit the free movement of the stop member therein as the receptacle is moved between the forwardmost and rearwardmost positions, the groove having a groove stop therein position toward the rearward end of the groove to prevent rearward travel of the member and the receptacle beyond the receptacle rearwardmost position.

26. The insert of claim 23 wherein the stop member is fixedly attached to the receptacle and has transversely projecting flanges, and wherein the groove has corresponding transversely extending undercuts, the undercuts being positioned to slidably receive the flanges to prevent the upward movement of the receptacle away from the bedliner.

27. A storage insert for use with a pickup truck having a truck bed and a tailgate, comprising:
a bedliner positionable on the truck bed and having a forward end toward the truck cab and a rearward end toward the rearward end of the truck bed;
a bedliner extension positionable on the tailgate when in the opened, generally horizontal position;
a storage receptacle positioned on the bedliner and bedliner extension, and movable thereover, the receptacle having means for storing objects therein, the receptacle being movable between a forwardmost stowed position adjacent to the truck cab and a rearwardmost access position over the bedliner extension at the rearward end of the truck tailgate;
at least one elongated guide track on the bedliner and bedliner extension extending from about the bedliner forward end to about the bedliner extension rearward end for guiding the receptacle movement on the bedliner between the forwardmost and rearwardmost positions;
engagement means attached to the receptacle for engaging the guide track to limit lateral movement of the receptacle as the receptacle moves along the track; and forward retainer means for releasably retaining the receptacle in the forwardmost position; and a handle connected to the receptacle for pulling the receptacle to the rearwardmost position and for pushing the receptacle to the rearwardmost position and for pushing the pivotally connected to the receptacle and having a length which allows the handle to be pivoted downward to a generally vertically oriented, downwardly projecting position when the receptacle is in the rearwardmost position, without the handle contacting the ground.

* * * * *

UNITED STATES PATENT AND TRADEMARK OFFICE
CERTIFICATE OF CORRECTION

PATENT NO. : 4,752,095

DATED : June 21, 1988

INVENTOR(S) : Dean S. Brady

It is certified that error appears in the above—identified patent and that said Letters Patent is hereby corrected as shown below:

In claim 16, line 1, delete "1" and substitute therefor --15--.

Signed and Sealed this

Fifteenth Day of November, 1988

Attest:

*Attesting Officer*

DONALD J. QUIGG

*Commissioner of Patents and Trademarks*